(12) United States Patent
Cook

(10) Patent No.: US 8,355,694 B2
(45) Date of Patent: Jan. 15, 2013

(54) OBVIATING MOBILE AIRTIME MINUTES FOR BUSINESS TELEPHONE CALLS

(75) Inventor: Jason Cook, Urbana, OH (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 355 days.

(21) Appl. No.: 12/653,531

(22) Filed: Dec. 15, 2009

(65) Prior Publication Data

US 2011/0143729 A1    Jun. 16, 2011

(51) Int. Cl.
*H04M 11/00* (2006.01)

(52) U.S. Cl. ........... 455/406; 455/445; 455/405; 705/52

(58) Field of Classification Search ................. 455/406, 455/405, 445; 705/52, 77–79
See application file for complete search history.

(56) References Cited

U.S. PATENT DOCUMENTS

| | | | | |
|---|---|---|---|---|
| 5,557,664 A * | 9/1996 | Burns et al. | | 379/127.05 |
| 5,742,667 A * | 4/1998 | Smith | | 379/112.09 |
| 5,943,393 A * | 8/1999 | Howell | | 379/35 |
| 6,167,124 A * | 12/2000 | Johnson et al. | | 379/112.01 |
| 6,516,060 B1 * | 2/2003 | Foladare et al. | | 379/211.03 |
| 6,654,451 B1 * | 11/2003 | Ward | | 379/114.24 |
| 7,155,204 B1 * | 12/2006 | Hefter et al. | | 455/406 |
| 7,274,784 B2 * | 9/2007 | Bedingfield et al. | | 379/219 |
| 7,386,307 B1 * | 6/2008 | Burnham | | 455/426.1 |
| 7,606,554 B1 * | 10/2009 | Bonner et al. | | 455/403 |
| 2002/0147001 A1 * | 10/2002 | Newdelman et al. | | 455/405 |
| 2002/0191762 A1 * | 12/2002 | Benson | | 379/133 |
| 2003/0045268 A1 * | 3/2003 | Himmel et al. | | 455/408 |
| 2003/0176199 A1 * | 9/2003 | Burnham | | 455/464 |
| 2003/0233278 A1 * | 12/2003 | Marshall | | 705/14 |
| 2004/0097271 A1 * | 5/2004 | Aerrabotu | | 455/565 |
| 2004/0204119 A1 * | 10/2004 | Ho et al. | | 455/564 |
| 2005/0044243 A1 * | 2/2005 | Narayanan et al. | | 709/229 |
| 2005/0101289 A1 * | 5/2005 | Halsell | | 455/406 |
| 2007/0071196 A1 * | 3/2007 | Ward | | 379/114.03 |
| 2007/0149202 A1 * | 6/2007 | Mendiratta et al. | | 455/445 |
| 2008/0310614 A1 * | 12/2008 | Ward | | 379/221.14 |
| 2009/0022301 A1 * | 1/2009 | Mudaliar | | 379/221.14 |
| 2009/0068984 A1 * | 3/2009 | Burnett | | 455/408 |
| 2009/0247121 A1 * | 10/2009 | Morrison, Jr. | | 455/406 |

* cited by examiner

*Primary Examiner* — Kamran Afshar
*Assistant Examiner* — Mong-Thuy Tran

(57) ABSTRACT

Systems and methods are described that provide a phantom mobile telephone number that is assigned by the mobile telephone service provider, for business customers and/or customers subscribing to the service. Upon receipt of the phantom mobile telephone number at the mobile service provider's internal call routing system, the call is associated with a preexisting landline number assigned to a business. The mobile telephone call is forwarded to the preexisting landline telephone number and is not charged airtime minutes.

20 Claims, 5 Drawing Sheets

FIG. 3
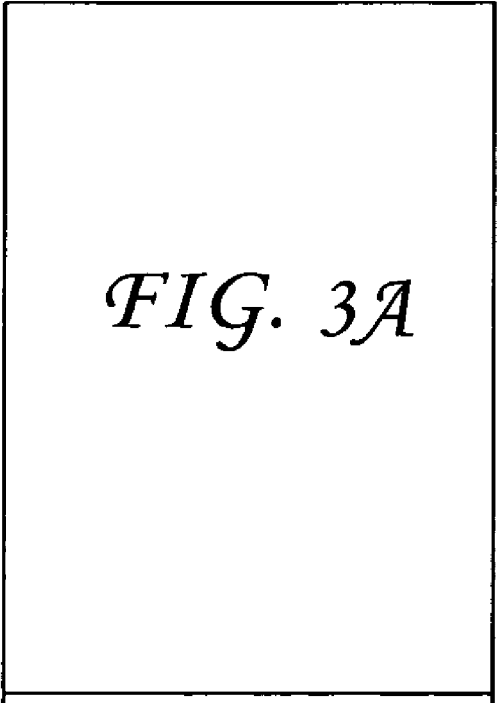
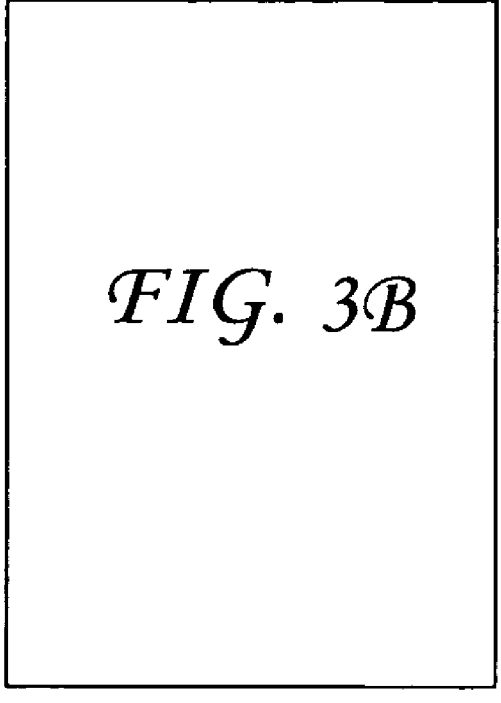

OBVIATING MOBILE AIRTIME MINUTES FOR BUSINESS TELEPHONE CALLS

BACKGROUND OF THE INVENTION

The invention relates generally to mobile (cellular) telephone communications services. More specifically, the invention relates to methods and systems that enable businesses to subscribe to a mobile telephone service that allows subscriber's to a mobile telephone service provider to place a telephone call to a business and not have their allotted contract airtime minutes (subscriber-based measured-per-minute call charge) debited.

Presently, mobile telephone service provider subscriber service contracts include a predetermined number of contracted-for airtime minutes. When a subscriber (customer) uses more than their allotted airtime minutes in a given billing period, the over minutes are charged at an inflated rate. Therefore, subscribers usually monitor their airtime minute usage to prevent over minutes, or if their airtime use warrants it, change to a service plan that includes more airtime minutes.

Calling businesses for general information, pricing inquiries and orders from a mobile telephone consumes airtime minutes. Especially if a call is placed on hold for several minutes.

Due to the proliferation of mobile telephone service, many consumers are dropping landline telephone services. This becomes more troublesome for business owners. If consumers minimize time spent shopping from one business to another due to mobile telephone airtime minute usage, business in general suffers and competition between like businesses is affected.

What is desired are methods and systems that forward a call placed from a mobile telephone to a preexisting business landline telephone number not using airtime minutes.

SUMMARY OF THE INVENTION

The inventor has discovered that it would be desirable to have methods and systems that provide a phantom mobile telephone number that is assigned by the mobile telephone service provider, for business customers and/or customers subscribing to the service. Upon receipt of the phantom mobile telephone number at the mobile telephone service provider's internal call routing system, the call is associated with a preexisting landline number assigned to a business. The mobile telephone call is forwarded to the preexisting landline telephone number and the caller is not charged airtime minutes. The phantom mobile telephone number may be displayed or highlighted in advertisements touting a free call for customers that subscribe to that mobile telephone service provider.

Embodiments minimize losing sales calls from mobile telephone users that do not want to use their airtime minutes. Embodiments may also promote one mobile telephone service provider over another for consumers who cancel their landline telephone service and decide to have only mobile telephone service or use a service such as a naked or dryloop Digital Subscriber Line (DSL).

One aspect of the invention provides a method that prevents airtime minutes from being used when contacting a business using a mobile telephone. Methods according to this aspect include for the business, choosing one or more mobile telephone service providers, from each chosen mobile telephone service provider, obtaining a phantom mobile telephone number, associating the one or more phantom mobile telephone numbers with one or more landline telephone numbers assigned to the business, initiating a mobile telephone call to the business from a mobile telephone having a service subscription with a mobile telephone service provider who is one of the one or more chosen mobile telephone service providers using the phantom mobile telephone number corresponding to that mobile telephone service provider and business, receiving the phantom mobile telephone number call at the mobile telephone service provider's Mobile Telephone Switching Office (MTSO) and Mobile Switching Center (MSC) further comprising accessing a phantom telephone number database, comparing the received phantom mobile telephone number with the phantom telephone number database, associating the received phantom mobile telephone number with a phantom telephone number subscriber database, switching the received phantom mobile telephone number to one or more subscriber business landline numbers associated with the received phantom mobile telephone number in the phantom telephone number subscriber database, completing the mobile telephone call to the business associated with the received phantom mobile telephone number, and not debiting airtime minutes from the mobile subscriber's account who initiated the phantom mobile telephone number call.

Another aspect of the invention provides a system that prevents mobile telephone airtime minutes from being used when contacting a business. Systems according to this aspect include a Mobile Telephone Switching Office (MTSO) and Mobile Switching Center (MSC) configured to receive a mobile telephone call, and a processor and a storage device having embodied therein a program for execution by the processor, the program providing a framework configured to accessing a phantom telephone number database, comparing a received phantom mobile telephone number with a phantom telephone number database, associating the received phantom mobile telephone number with a phantom telephone number subscriber database, switching the received phantom mobile telephone number to one or more subscriber business landline numbers associated with the received phantom mobile telephone number in the phantom telephone number subscriber database, completing the mobile telephone call to the business associated with the received phantom mobile telephone number, and not debiting airtime minutes from the mobile subscriber's account who initiated the phantom mobile telephone number call.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
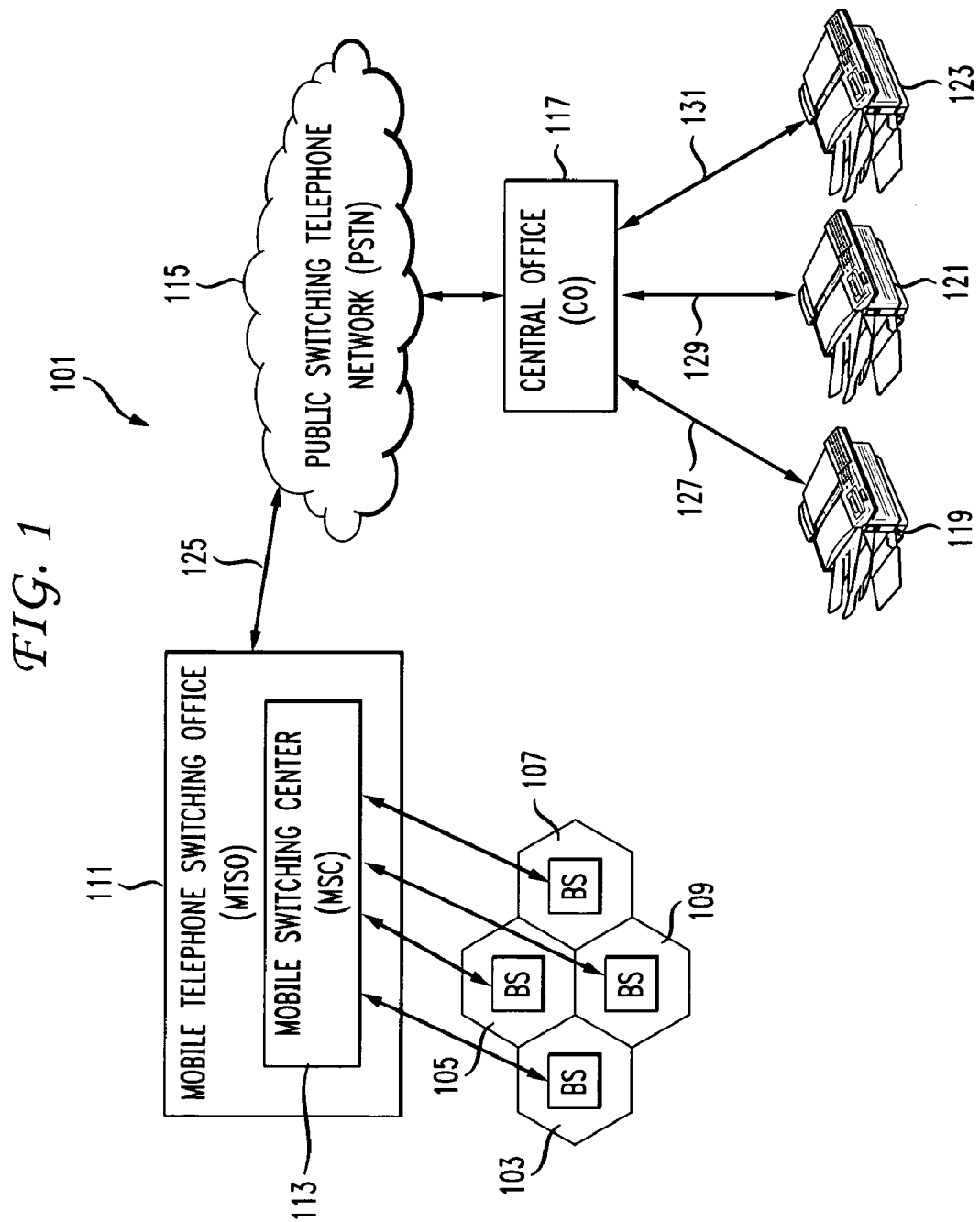
FIG. 1 is an exemplary mobile/landline telecommunications network topology.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, systems, and a computer-usable medium storing computer-readable instructions configured to obviate mobile airtime minute usage when making telephone calls to a business that has subscribed to the service. Embodiments use a phantom mobile telephone number assigned by a mobile telephone service provider to a specific business customer. After a call is placed by a subscriber of the mobile telephone service provider, the call is associated with a preexisting landline telephone number assigned to the business and is not charged airtime minutes after the call is completed.

By way of background, a telephone communications system includes both mobile and landline (wireline) telephone internal switching equipment, such as Class 4, Class 5 and other switch Classes. The switching equipment programming allows for a telephone number to be forwarded to any other telephone number. The use of a traditional telephone provider's landline network (copper, pair gain, and fiber-optic cable) couples a business with a local telephone company's central office. The central office houses switching equipment that receives a forwarded call and sends it out on office equipment where the dial tone begins. The office equipment is coupled to the outgoing copper, pair gain, or fiber-optic cables that deliver the call to the business receiving the call.

FIG. 1 shows a mobile/landline telecommunications network topology 101. The topology typically includes a plurality of cell site Base Stations (BSs) 103, 105, 107, 109 communicating with mobile telephones/mobile subscriber units (not shown), at least one Mobile Telephone Switching Office (MTSO) 111, a Mobile Switching Center (MSC) 113, one or more Public Switched Telephone Networks (PSTNs) 115, a PSTN Central Office (CO) 117 and a plurality of landline telephones 119, 121, 123.

The MTSO 111 is the central office for switching calls to mobile telephones as well as to local and long distance landline telephone companies and compiles billing information. The MTSO 111 also provides resources needed to efficiently serve a mobile subscriber such as registration, authentication, location updating and call routing. The MTSO 111 houses the Mobile Switching Center (MSC) 113 that provides field monitoring and relay stations for switching calls from cell sites 103, 105, 107, 109 to wireline PSTN 115 COs 117. The MSC 113 controls calls, tracks billing information and locates cellular subscribers.

The MTSO 111 is coupled to a telephone exchange by a trunk group 125. This provides an interface to the PSTN 115 and connectivity. The region to be served by a Cellular Geographic Serving Area (CGSA) is split into geographic cell sites 103, 105, 107, 109. The MTSO 111 also provides switching and control functions for a group of cell sites. To achieve this, there is connectivity between the MTSO and the facilities in the cell site. Besides providing a means of connection to the PSTN 115, the MTSO 111 also controls the activities of the cell sites 103, 105, 107, 109 and actions of mobile telephones through command and control data channels.

The MTSO 111 performs call routing. When a mobile telephone is turned on, it listens for the network operator's System Identification Code (SID)) on the control channel. If it cannot find any control channels to listen to then it assumes it is outside the range and displays a message indicating no service. If it finds a control channel to listen to, receives the SID and then compares it to the SID programmed into the mobile telephone. If both SID's match then it knows that it is communicating with a cell in its home system. The mobile telephone also transmits a registration request along with the SID. The MTSO 111 then knows the location of the mobile telephone, which it records in a database so that it knows which cell to target when it wants to ring that telephone for an incoming call. When the MTSO 111 receives a call, it checks its database for the location of the telephone. Then it picks a frequency pair the telephone will use in that cell to take the call. The MTSO 111 communicates with the telephone over the control channel to tell it which frequencies to use, and once the telephone and the tower switch on those frequencies, the call is connected.

Each mobile telephone uses a separate, temporary radio channel to talk to a cell site. Each cell site communicates with many mobile telephones at once, using one channel per mobile telephone. Channels use a pair of frequencies for communication. One frequency (forward link) is used for transmitting from the cell site and one frequency (the reverse link) is used for the cell site to receive calls from the users. Radio energy dissipates over distance, so mobiles must stay near the base station to maintain communications. Cell sites 103, 105, 107, 109 refer to the physical location of radio equipment that provides coverage within a cell. The hardware located at a cell site includes power supplies, interface equipment, radio frequency transmitters and receivers, and antenna systems.

The PSTN 115 is made up of local networks, exchange area networks and long-haul networks that interconnect telephones and other communication devices on a worldwide basis.

Digital switches (not shown) located at the MTSO 111 and throughout the PSTN 115 work by connecting two or more digital circuits together according to a dialed telephone number. Telephone calls are set up between switches using the Signaling System 7 (SS7) protocol or one of its variants. A digital switch typically is a switch that performs time division switching of digitized signals.

Individual local loop telephone lines 127, 129, 131 may be coupled to a remote concentrator (not shown). In many cases, the concentrator is co-located in the same building as a switch. Some telephone switches do not have concentrators directly coupled to them, but rather are used to connect telephone calls between other telephone switches and are referred to as carrier-level switches or tandems.

Figure 2:
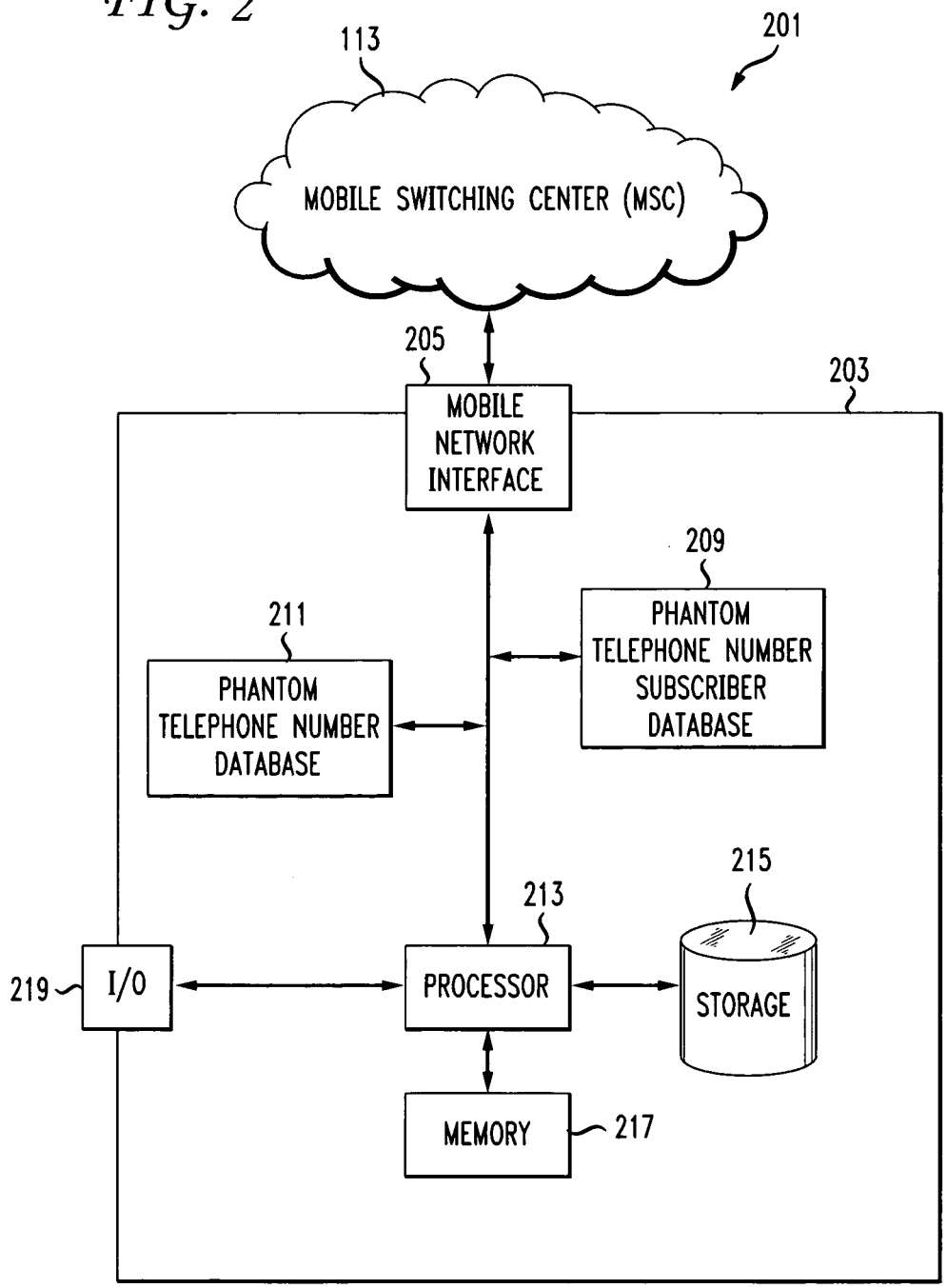
FIG. 2 is an exemplary system framework.
Figure 3A:
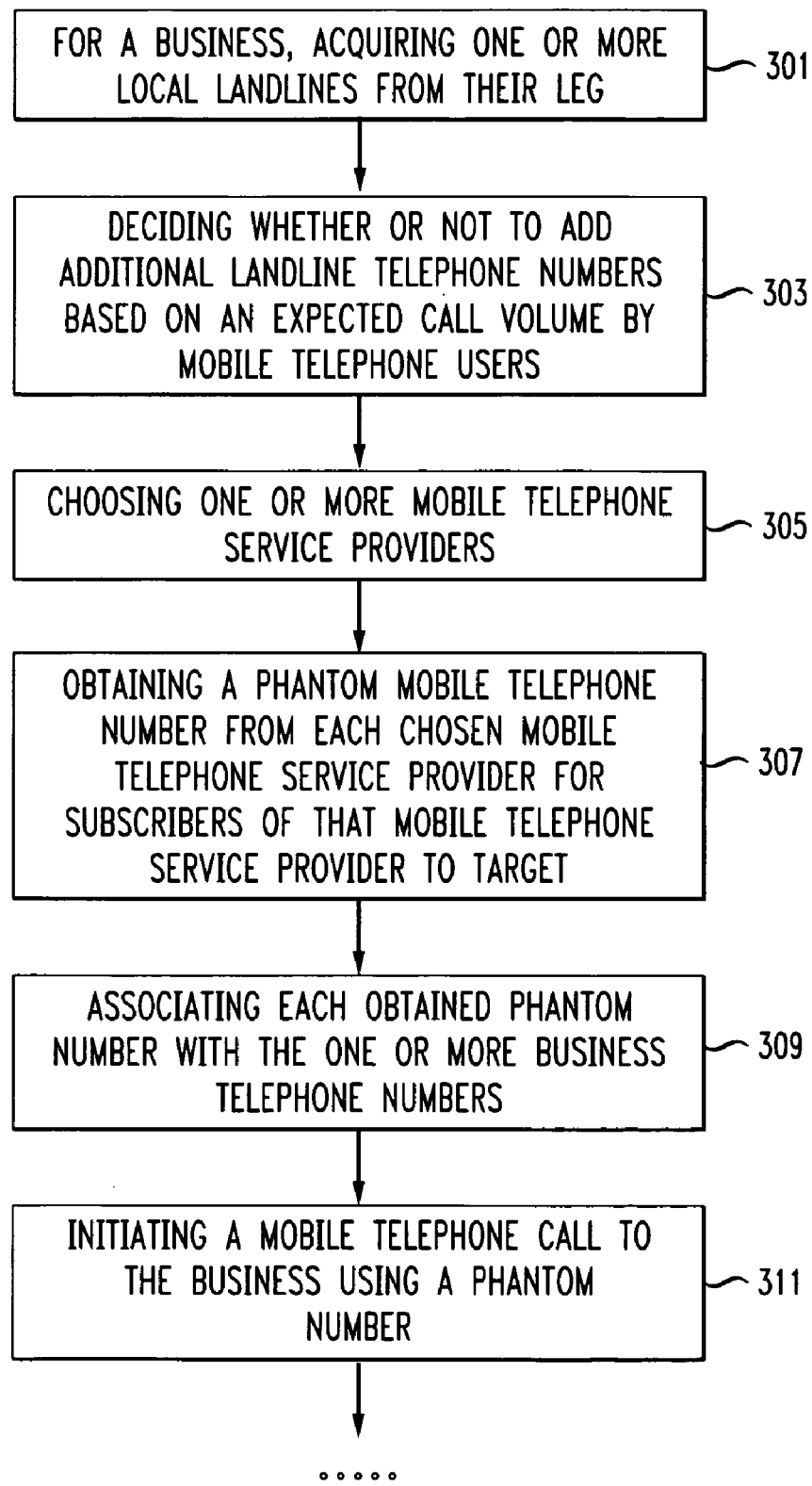
FIG. 3 is an exemplary method.
Figure 3B:
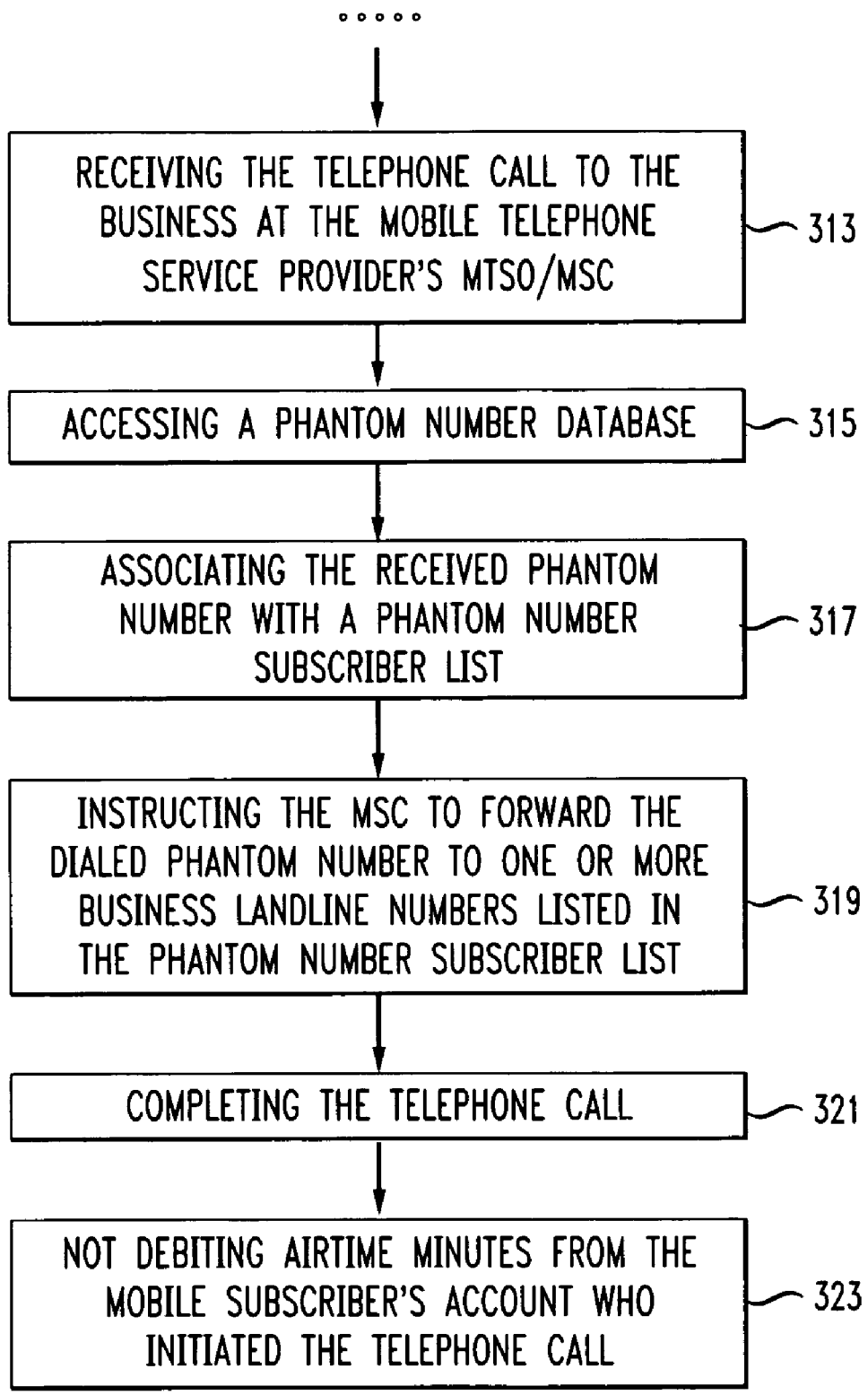

FIG. 2 shows an embodiment of a system 201 framework 203. FIG. 3 shows a method according to one embodiment.

Based on existing telephony technology, methods may be executed on a mobile carrier's database which assigns and routes calls made on their network. This is where the actual forwarding of a call occurs. Embodiments allow a phantom mobile telephone number to be forwarded to a business's local exchange provider. Components of the invention may be enabled as a modular framework and/or deployed as software as an application program tangibly embodied on a program storage device. The application code for execution can reside on a plurality of different types of computer readable media known to those skilled in the art.

The framework 203 may be a standalone or part of an MSC 113 switch located at the MTSO 111 and includes a mobile network interface 205 coupled to the MSC 113. The interface 205 is coupled to a phantom telephone number subscriber database 209, a phantom telephone number database 211 and a processor 213. The processor 213 is coupled to storage 215, memory 217 and I/O 219.

The framework 203 stores mobile telephone users and their target landline telephone numbers assigned to businesses that have subscribed to the service into the database 209. The framework 203 may be implemented as a computer including a processor 213, memory 217, storage devices 215, software and other components. The processor 213 is coupled to the interface 205, I/O 219, storage 215 and memory 217 and controls the overall operation of the computer by executing instructions defining the configuration. The instructions may be stored in the storage device 215, for example, a magnetic disk, and loaded into the memory 217 when executing the configuration. The invention may be implemented as an application defined by the computer program instructions stored in the memory 217 and/or storage 215 and controlled by the processor 213 executing the computer program instructions. The I/O 219 allows for user interaction with the computer via peripheral devices such as a display, a keyboard, a pointing device, and others.

Embodiments provide a service that allows mobile telephone callers to contact a business without using airtime minutes from their mobile accounts. A subscriber to the service, such as a business, contacts their local landline service provider who provides their landlines (telephone numbers) (step 301). The business may purchase one or more Local Exchange Carrier (LEC) numbers that are associated with their business. This is performed if the business expects to receive a higher volume of calls placed by mobile telephone callers (step 303).

The business may choose to contact their local landline service provider if that provider is also a mobile telephone service provider, or may choose one or more mobile telephone service providers not affiliated with their landline service provider (step 305). Each mobile telephone service provider assigns and associates a phantom (unique) mobile telephone number with one or more landline telephone numbers associated with the business in accordance with a service contract (steps 307, 309). The business may have the phantom mobile telephone number(s) forwarded to existing extensions for their business if they choose.

The phantom mobile telephone number is stored in the phantom telephone number database 211 and the one or more business landline telephone numbers are stored in the phantom telephone number subscriber database 209. The use of the phantom mobile telephone number allows a customer using a mobile telephone having a service contract with a chosen mobile telephone service provider 209 to call the business without using his contracted-for airtime minutes. For example, the business may choose AT&T Mobility as one mobile telephone service provider. The phantom mobile telephone number is assigned by AT&T Mobility for AT&T Mobility subscribers to use to contact the business. If a particular LEC has preexisting contracts to sell phantom mobile telephone numbers for one or more mobile service providers, that LEC's business office representative may assign phantom mobile telephone numbers from the different mobile telephone service providers that can be forwarded to one LEC telephone line for the business. The phantom mobile telephone numbers may be advertised as free calls for their respective mobile subscribers.

When a customer is searching for a business to quote a price, check availability for an item, or to set an appointment for service, they typically look in their phonebook, online to the business's website, at mailed pamphlets, or at newspaper advertisements. The customer may see an advertisement listing free calls for subscribers of specific mobile telephone service providers. For example, if ordering a pizza, posted on the pizza shop's advertisement may be free calls for AT&T mobile subscribers using (555) 555-5555 (a phantom mobile telephone number) and for Verizon mobile subscribers using (555) 555-6666 (a phantom mobile telephone number). If a mobile call is placed by a subscriber belonging to either AT&T or Verizon using their respective phantom mobile telephone number, no airtime minutes belonging to their account will be used. Furthermore, regardless of the number of phantom mobile telephone numbers for different mobile telephone service providers a business contracts for, mobile telephone calls placed using these mobile telephone service providers can all be forwarded to one particular extension at their business. If a business expects a large number of mobile and/or landline telephone calls, they may purchase additional landlines that will be set up to roll over from one to the next when the number that these calls are forwarded to is busy. For example, if the business has telephone calls placed using phantom mobile telephone numbers forwarded to (555) 555-1111, the business may purchase (555) 555-1112, 555-1113 and 555-1114. The business's LEC will program the additional numbers into a hunt group. This will allow the callers to reach the business even if the 555-1111 is busy. An incoming call would then ring 555-1112 and then 555-1113, etc.

A customer places a telephone call using a mobile telephone to the business using the phantom mobile telephone number (step 311). The telephone call is routed, via a cell site 103, 105, 107, 109, to the MTSO 111 and MSC 113 (step 313). The phantom telephone number database 211 is accessed and the received phantom mobile telephone number is compared and validated (steps 315, 317). The framework 203 instructs the MSC 113 to switch the dialed number (received phantom mobile telephone number) to one or more associated business landline telephone numbers listed in the phantom telephone number subscriber database 209 (step 319). The mobile telephone call is completed and the mobile customer that placed the telephone call is not debited airtime minutes according to the service (steps 321, 323).

When the business subscribing to the service advertises in local phonebooks, Internet sites, billboards, radio, mailers, etc., the advertisement may be accompanied by a phantom mobile telephone number as a "free call for _____ (insert the mobile telephone service provider name) users." When a customer opens their local telephone book or accesses multiple business websites, they may choose the business that allows them to use their mobile telephone to call for free.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for completing a mobile telephone call comprising: obtaining a phantom mobile telephone number from a mobile telephone service provider;
associating the phantom mobile telephone number with a landline telephone number assigned to a business;
receiving, at a mobile switching center of the mobile telephone service provider, a mobile telephone call directed to the phantom mobile telephone number from a mobile telephone having a service subscription with the mobile telephone service provider;
accessing a phantom telephone number database;
comparing the phantom mobile telephone number with telephone numbers in the phantom telephone number database to determine whether the phantom telephone number is in the phantom telephone number database;
responsive to the phantom mobile telephone number being in the phantom telephone number database, determining a landline telephone number associated with the phantom mobile telephone number by accessing a phantom telephone number subscriber database;
responsive to the phantom mobile telephone number being in the phantom telephone number database, switching the received mobile telephone call directed to the phantom mobile telephone number to the landline telephone number associated with the phantom mobile telephone number;
completing the mobile telephone call to the business associated with the received phantom mobile telephone number; and
responsive to the phantom mobile telephone number being in the phantom telephone number database, not debiting airtime minutes related to the mobile telephone call from the service subscription of the mobile telephone.

2. The method according to claim 1 further comprising validating the phantom mobile telephone number with the phantom telephone number database.

3. The method according to claim 1 wherein the phantom mobile telephone number is associated with a plurality of landline telephone numbers assigned to the business.

4. The method according to claim 3, wherein a quantity of the landline telephone numbers is determined depending on expected call volume.

5. The method according to claim 4 wherein the mobile telephone service provider is affiliated with a landline telephone service provider providing the landline telephone number assigned to the business.

6. The method according to claim 1 wherein the phantom telephone number subscriber database is accessed by the mobile switching center.

7. The method according to claim 1 further comprising listing the one or more phantom mobile telephone numbers on a business advertisement.

8. The method according to claim 7 wherein the business advertisement includes phonebooks, business websites, mailed flyers, newspaper advertisements, and radio and television commercials.

9. The method according to claim 1 further comprising:
receiving a payment from the business to the mobile service provider for use of the phantom telephone number.

10. A system for completing a mobile telephone call comprising:
a mobile switching center configured to receive a mobile telephone call; and
a processor and a storage device having embodied therein a program for execution by the processor, the program providing a framework for:
accessing a phantom telephone number database;
comparing a received phantom mobile telephone number with mobile telephone numbers stored in the phantom telephone number database to determine whether the phantom telephone number is in the phantom telephone number database;
responsive to the phantom mobile telephone number being in the phantom telephone number database, determining a landline telephone number associated with the phantom mobile telephone number by accessing a phantom telephone number subscriber database;
responsive to the phantom telephone number being in the phantom telephone number database, switching the received phantom mobile telephone number to one or more subscriber business landline numbers associated with the received phantom mobile telephone number in the phantom telephone number subscriber database;
completing the mobile telephone call to a business associated with the received phantom mobile telephone number; and
responsive to the phantom telephone number being in the phantom telephone number database, not debiting airtime minutes related to the mobile telephone call from an account of a mobile subscriber who initiated the telephone call to the phantom mobile telephone number.

11. The system according to claim 10 wherein the framework further comprises validating the received phantom mobile telephone number with the phantom telephone number database.

12. The system according to claim 10 wherein the phantom mobile telephone number is associated with a plurality of landline telephone numbers assigned to the business.

13. The system according to claim 10 wherein the phantom telephone number subscriber database is accessed by the mobile switching center.

14. The system according to claim 10, further comprising a plurality of mobile switching centers each operated by a different mobile telephone service provider, each mobile telephone service provider being assigned a different phantom mobile telephone number.

15. A tangible computer-usable medium having computer readable instructions stored thereon for execution by a processor to perform operations for completing a mobile telephone call, comprising:
receiving a mobile telephone call directed to a phantom telephone number;
comparing the phantom telephone number with telephone numbers stored in a phantom telephone number database to determine whether the phantom telephone number is in the phantom telephone number database;
responsive to the phantom telephone number being in the phantom telephone number database, switching the mobile telephone call to a subscriber business landline number associated with the received phantom mobile telephone number in a phantom telephone number subscriber database;
completing the mobile telephone call to a business associated with the phantom telephone number; and
responsive to the phantom telephone number being in the phantom telephone number database, not debiting airtime minutes associated with the mobile telephone call from an account of a mobile subscriber who initiated the mobile telephone call.

16. The tangible computer-usable medium according to claim 15 wherein the method further comprises:
    validating the phantom telephone number using the phantom telephone number database.

17. The tangible computer-usable medium according to claim 15, wherein the phantom mobile telephone number is associated with a plurality of landline telephone numbers assigned to the business.

18. The tangible computer-usable medium according to claim 10, wherein the phantom mobile telephone number is associated with the phantom telephone number subscriber database at a mobile switching center.

19. The tangible computer-usable medium according to claim 15 wherein the method further comprises:
    forwarding the mobile telephone call to an existing extension of the business.

20. The tangible computer-usable medium according to claim 15 wherein the method further comprises:
    rolling over the mobile telephone call from a first business number to a second business number in response to the first business number being busy.

\* \* \* \* \*